(12) United States Patent
Walker et al.

(10) Patent No.: US 7,547,427 B2
(45) Date of Patent: Jun. 16, 2009

(54) MULTIPLE STAGE SEPARATOR VESSEL

(75) Inventors: Patrick D. Walker, Des Plaines, IL (US); Daniel N. Myers, Des Plaines, IL (US); Jeffrey A. Sexton, Findlay, OH (US); John F. Hill, Jr., Findlay, OH (US)

(73) Assignee: UOP LLC, Des Plaines, IL (US)

( * ) Notice: Subject to any disclaimer, the term of this patent is extended or adjusted under 35 U.S.C. 154(b) by 635 days.

(21) Appl. No.: 11/315,851

(22) Filed: Dec. 22, 2005

(65) Prior Publication Data

US 2007/0202027 A1 Aug. 30, 2007

(51) Int. Cl.
*B01D 45/00* (2006.01)

(52) U.S. Cl. ............ 423/215.5; 422/147; 422/169
(58) Field of Classification Search ........ 423/215.5; 422/147, 169
See application file for complete search history.

(56) References Cited

U.S. PATENT DOCUMENTS

| | | | |
|---|---|---|---|
| 5,690,709 A | 11/1997 | Barnes | 55/348 |
| 6,166,282 A | 12/2000 | Miller | 585/638 |
| 6,673,133 B2 | 1/2004 | Sechrist et al. | 55/348 |
| 6,797,026 B2 | 9/2004 | Sechrist et al. | 55/348 |

*Primary Examiner*—Edward M Johnson
(74) *Attorney, Agent, or Firm*—James C Paschall

(57) ABSTRACT

A novel multiple stage separator (MSS) vessel is disclosed wherein the vessel includes at least first and second stages or decks of separation cyclones, the stages arranged for operation in series. Each stage or deck includes an upper and lower tube sheet on which a plurality of cyclones are installed, solid particles in the gas stream being separated from the stream and dispensed between the tube sheets as the stream passes through each stage. The vessel has an inlet to receive a gas stream containing the particulates, and the flow travels typically downwardly, first passing through the first stage, then passing through at least a second stage. When implemented downstream of a fluid catalytic cracking (FCC) unit, the MSS has been found to remove a surprisingly increased amount of particulates over a conventional third stage separator (TSS), which contains a single stage separator.

21 Claims, 1 Drawing Sheet

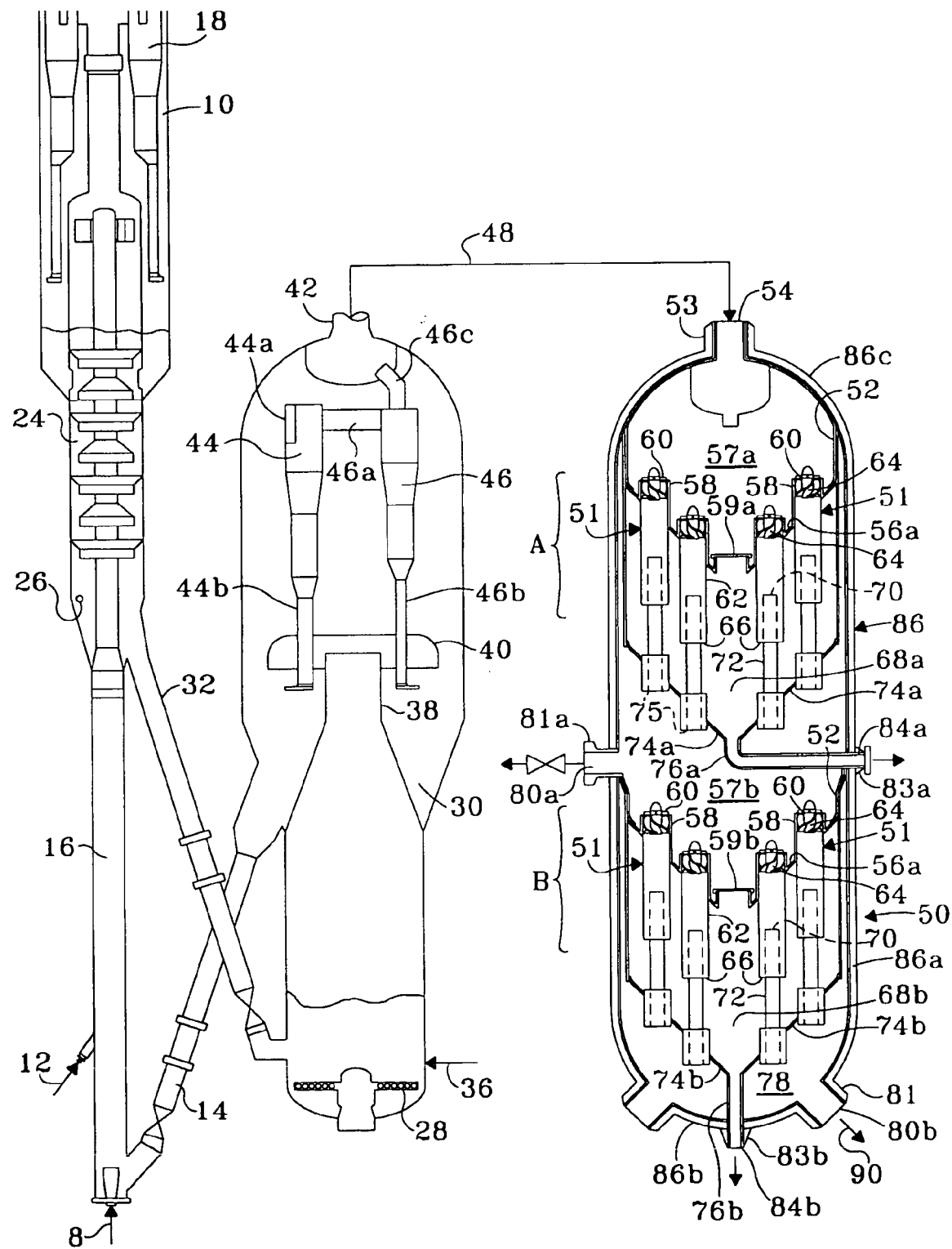

MULTIPLE STAGE SEPARATOR VESSEL

FIELD OF THE INVENTION

The present invention generally relates to a separator vessel that removes particles from a gas stream laden with solids and more particularly relates to a device commonly known as third stage separator (TSS) vessel for removing catalyst fines from hot regenerator flue gas of a fluid catalytic cracking (FCC) unit.

BACKGROUND OF THE INVENTION

FCC technology has long been a predominant means of producing gasoline. In an FCC process, gasoline is formed as the result of cracking heavier (i.e. higher molecular weight), less valuable hydrocarbon feed stocks such as gas oil. Although FCC is a large and complex process involving many factors, a general outline of the technology is presented here in the context of its relation to the present invention.

The FCC process generally includes a reactor that is closely coupled with a regenerator, followed by downstream hydrocarbon product separation. Hydrocarbon feed 15 contacts catalyst in the reactor to crack the hydrocarbons down to smaller molecular weight products. During this process, the catalyst tends to accumulate coke thereon, which is burned off in the regenerator.

The heat of combustion in the regenerator typically produces a flue gas having an extremely high temperature. It is desirable to provide a power recovery device, such as expander turbine, to recover energy from these high-temperature flue gases. It is known, for example, to provide a turbine that can be coupled to an air blower to produce combustion air for the regenerator, a generator to produce electrical power.

The FCC process results in a continuous fluidization and circulation of large amounts of catalyst having an average particle diameter of about 50 to 100 microns, equivalent in size and appearance to very fine sand. For every ton of cracked product made, approximately 5 tons of catalyst are needed, hence the considerable circulation requirements. Coupled with this need for a large inventory and recycle of catalyst with small particle diameters is the ongoing challenge to prevent this catalyst from exiting the reactor/regenerator system into effluent streams.

The U.S. Environmental Protection Agency has limited emissions of catalyst from an FCC stack to 1.0 lb. of catalyst per lb. of coke regenerated. In particular situations, the emissions standard can be limited to 0.8 lbs. of catalyst per lb. of coke regenerated. It is desirable to reduce catalyst concentration in the flue gas to meet environmental regulatory emissions standards and also to provide a margin to ensure normal fluctuations in emissions will still be below environmental regulatory standards.

Additionally, catalyst particles are abrasive and thus are capable of damaging and eroding components located downstream of the regenerator, such as a turbine. If exposed to catalyst particles, blades of the turbine would erode and result in loss of power recovery efficiency. Moreover, even though catalyst fines; i.e., particles less than 10 µm in dimension, do not erode expander turbine blades as significantly, they still accumulate on the blades and casing. Blade accumulation can cause blade tip erosion and casing accumulation can increase the likelihood of the tip of the blade rubbing against the casing of the expander turbine which can result in high expander shaft vibration. Therefore, it is desirable to remove catalyst particles from the regenerator flue gas.

In order to remove solid catalyst particles, cyclone separators internal to both the reactor and regenerator have conventionally been implemented. Typically, the regenerator includes first and second (or primary and secondary) stage separators for the purpose of preventing catalyst contamination of the regenerator flue gas, which is essentially the resulting combustion product of catalyst coke in air. While normally sized catalyst particles are effectively removed in the internal regenerator cyclones, fines material (generally catalyst fragments smaller than about 50 microns resulting from attrition and erosion in the harsh, abrasive reactor/regenerator environment) is substantially more difficult to collect. As a result, the FCC flue gas will usually contain a particulate concentration in the range of about 100 to 500 mg/Nm$^3$. This solids level can present difficulties related to the applicable legal emissions standards and are still high enough to risk damage to the power recovery expander turbine.

A further reduction in FCC flue gas fines loading is therefore often warranted, and may be obtained from a third stage separator (TSS). The term "third" in TSS typically presumes a first stage cyclone and a second stage cyclone are used for gas-solid separation upstream of the inlet to the TSS. These cyclones are typically located in the catalyst regeneration vessel. It is possible to provide more separator devices or fewer separator devices upstream of the TSS. Hence, as used herein, the term TSS does not require that exactly two separator devices are located upstream of the TSS vessel. The TSS induces centripetal acceleration to a particle-laden gas stream to force the higher-density solids to the outer edges of a spinning vortex. A conventional TSS vessel for an FCC flue gas effluent will normally contain a single stage of cyclone separators, including a deck on which a plurality of individual cyclones is installed within a single vessel. The deck includes upper and lower tube sheets affixing the upper and lower ends of the cyclones to distribute contaminated gas to the cyclone inlets and also to divide the region within the vessel into sections for collecting the separated gas and solid phases.

Examples of conventional TSS units having a single stage of cyclone separators are disclosed in U.S. Pat. Nos. 5,690,709; 6,673,133 and 6,797,026. Although such conventional TSS units have operated to remove a substantial proportion of particulates from the gas stream, it is desirable to provide a TSS that yields an increased reduction in particulate fines.

SUMMARY OF THE INVENTION

A multiple stage separator (MSS) vessel is provided for implementation downstream of an FCC regenerator system. The MSS vessel includes at least primary and secondary stages or decks of separation cyclones in the vessel, the stages arranged for operation in series. Each stage or deck includes a first and second tube sheet on which a plurality of cyclones are installed, solid particles in the gas stream being separated from the stream and dispensed between the tube sheets as the stream passes through each stage. The vessel has an inlet to receive a gas stream containing the particulates, and the flow travels preferably downwardly, first passing through the first stage, then passing through at least a second stage. When implemented downstream of a fluid catalytic cracking (FCC) regenerator unit, the MSS has been calculated to remove a surprisingly increased amount of particulates over a conventional third stage separator (TSS), which contains a single stage of separators.

In an embodiment, a separation vessel and process are provided that advantageously yield improved removal of particulate solids from a particle-contaminated gas stream.

BRIEF DESCRIPTION OF THE DRAWING

The FIGURE is a simplified schematic view of an FCC unit with the multiple stage separator of the present invention.

DETAILED DESCRIPTION OF THE INVENTION

The present invention applies to the purification of a broad range of solid-contaminated gas streams, and especially those containing dust particles in the 1 to 50 μm range. A number of commercial gas purification operations meet this description, including the treatment of effluent streams of solid catalyst fluidized bed processes, coal fired heaters, and power plants. Several well-known operations rely on fluidized bed technology, such as a preferred embodiment of the process for converting methanol to light olefins, as described in U.S. Pat. No. 6,166,282, using a solid catalyst composition. Another area of particular interest lies in the purification of FCC effluent streams that contain entrained catalyst particles resulting from attrition, erosion, and/or abrasion under process conditions within the reactor.

As mentioned, fluid catalytic cracking (FCC) is a well-known oil refinery operation relied upon in most cases for gasoline production. Process variables typically include a cracking reaction temperature of 400° to 600° C. and a catalyst regeneration temperature of 500° to 900° C. Both the cracking and regeneration occur at an absolute pressure below 5 atmospheres. The FIGURE shows a typical FCC process unit, where a heavy hydrocarbon feed or raw oil in a line 12 is contacted with a newly regenerated catalyst entering from a regenerated catalyst standpipe 14. This contacting may occur in a narrow reactor conduit 16, known as a reactor riser, extending upwardly through the bottom of a reactor vessel 10. The contacting of feed and catalyst is fluidized by gas from a fluidizing line 8. Heat from the catalyst vaporizes the oil, and the oil is thereafter cracked in the presence of the catalyst as both are transferred up the reactor conduit 16 into the reactor vessel 10 itself, operating at a pressure somewhat lower than that of the reactor conduit 16. The cracked light hydrocarbon products are thereafter separated from the catalyst at the end of the reactor conduit 16 and then in the reactor vessel 10 using a first stage internal reactor cyclone 18 and optionally a second stage internal reactor cyclone (not shown) and exit the reactor vessel 10 through a line 22 to subsequent fractionation operations. More cyclones or fewer cyclones may be used in the reactor vessel 10. At this point, some inevitable side reactions occurring in the reactor conduit 16 have left detrimental coke deposits on the catalyst that lower catalyst activity. The catalyst is therefore referred to as being spent (or at least partially spent) and requires regeneration for further use. Spent catalyst, after separation from the hydrocarbon product, falls into a stripping section 24 where steam is injected through a nozzle 26 to purge any residual hydrocarbon vapor. After the stripping operation, the spent catalyst is fed to a catalyst regeneration vessel 30 through a spent catalyst standpipe 32.

The FIGURE illustrates the regeneration vessel 30 known as a combustor. Those skilled in the art will recognize that various types of regeneration vessels may be suitable and that the invention is not limited to the exemplary regeneration vessel 30 illustrated. In the catalyst regeneration vessel 30, a stream of air is introduced through an air distributor 28 to contact the spent catalyst, burn coke deposited thereon, and provide regenerated catalyst. The catalyst regeneration process adds a substantial amount of heat to the catalyst, providing energy to offset the endothermic cracking reactions occurring in the reactor conduit 16. Some fresh catalyst is added in a line 36 to the base of the catalyst regeneration vessel 30 to replenish catalyst exiting the reactor vessel 10 and the regenerator vessel 30 as fines material or entrained particles. Catalyst and air flow upward together along a combustor riser 38 located within the catalyst regeneration vessel 30 and, after regeneration (i.e. coke burn), are initially separated by discharge through a disengager 40, also within the catalyst regeneration vessel 30.

Finer separation of the regenerated catalyst and flue gas exiting the disengager 40 is achieved using, for example, a first stage separator cyclone 44 and a secondary stage separator cyclone 46 within the catalyst regeneration vessel 30 as illustrated in the FIGURE. It is possible that more separator cyclones or fewer separator cyclones can be used in the regeneration vessel 30. Flue gas enters the first stage separator cyclone 44 through an inlet 44a. Catalyst separated from flue gas dispenses through a dipleg 44b while flue gas relatively lighter in catalyst travels through a conduit 46a into the secondary stage separator cyclone 46. Additional catalyst separated from the flue gas in the secondary stage separator cyclone 46 is dispensed into the catalyst regeneration vessel 30 through a dipleg 46b while flue gas relatively even lighter in solids exits the secondary stage separator cyclone 46 through an outlet tube 46c.

Regenerated catalyst is recycled back to the reactor vessel 10 through the regenerated catalyst standpipe 14. As a result of the coke burning, the flue gas vapors exiting at the top of the catalyst regeneration vessel 30 in a nozzle 42 contain $N_2$, CO, $CO_2$, $O_2$ and $H_2O$, along with smaller amounts of other species. While the first stage separator cyclone 44 and the secondary stage separator cyclone 46 can remove most of the regenerated catalyst from the flue gas in the nozzle 42, fine catalyst particles, resulting mostly from attrition, invariably contaminate this effluent stream. The fines-contaminated flue gas therefore typically contains about 100 to 500 mg/Nm$^3$ of particulates, most of which are less than 50 microns in diameter. In view of this contamination level, and considering both environmental regulations as well as the option to recover power from the flue gas, the incentive to further purify the relatively contaminated flue gas is significant.

In accordance with an aspect of the invention, in order to provide improved separation of particulate solids from a particle-contaminated gas stream, such as a gas stream exiting an FCC regenerator unit, a separator vessel is provided that includes multiple cyclone stages in series, i.e., at least first and second cyclone stages. Such a vessel effectively provides multiple stages of separation in an FCC system and thus is referred to herein as a multiple stage separator (MSS), which is intended to be used instead of a conventional TSS.

For example, an MSS vessel 50 is illustrated having features in accordance with the present invention. A conduit 48 delivers a stream of fines-contaminated flue gas from the catalyst regeneration vessel 30 to the MSS vessel 50. The MSS vessel 50 includes an exterior wall 86 that includes a generally cylindrical side portion 86a, a bottom portion 86b, and a top portion 86c, defining an enclosed interior. An inlet 54 is formed by an inlet pipe 53 that extends centrally preferably from the top portion 86c. A portion of the interior surface of the wall 86 such as at 86c is normally lined with a refractory material 52 to reduce erosion of the metal surfaces by the entrained catalyst particles. A diffuser may be used to distribute flow of the flue gas through the gas inlet 54.

In accordance with an aspect of the invention, the MSS vessel 50 includes multiple decks or stages of cyclones. For example, the MSS vessel 50 includes a primary separator stage A and a secondary separator stage B. Particularly, vertically below the inlet 54, at an intermediate position within the interior of the MSS vessel 50, the primary separator stage A is disposed within the vessel, and the secondary separator stage B is spaced vertically below the primary separator stage A. However, other arrangements are contemplated.

The first or primary separator stage A includes a first primary upper tube sheet 56a that retains the first or top ends 58 of the respective cyclones 51. In an embodiment, the upper tube sheet 56a extends the entire cross-section of the MSS vessel 50 in a manner that separates the interior to define a first or upper inlet chamber 57a so as to limit communication from the inlet chamber 57a and to remainder of the MSS vessel 50 except through the cyclones 51. In particular, each of the cyclones 51 has a cyclone inlet 60 that is open to the inlet chamber 57a. The tube sheet 56a may include a cover 59a for an optional manway in order to provide access through the upper tube sheet 56a. Those of ordinary skill in the art will recognize that various types of cyclones may be implemented with the present invention. The contaminated gas enters the respective cyclone inlets 60 and encounters swirl vanes 64 proximate the inlets 60 to induce centripetal acceleration of the particle-contaminated gas. The swirl vanes 64 are structures within a cylindrical cyclone body 62 that have the characteristic of restricting the passageway through which incoming gas can flow, thereby accelerating the flowing gas stream. The swirl vanes 64 also change the direction of the contaminated gas stream to provide a helical or spiral formation of gas flow through the length of the cylindrical cyclone body 62. This spinning motion imparted to the gas sends the higher-density solid phase toward the wall of the cylindrical cyclone body 62. The cyclones 51, in an embodiment, include a closed bottom end 66 of the cylindrical cyclone body 62 around a clean gas outlet tube 72. In one embodiment, the bottom end 66 defines a gap between the bottom end 66 and the clean gas outlet tube 72 to accommodate differential thermal expansion. Hence, the outlet tube 72 may be slidably positioned with respect to the cyclone body 62. Solid particles are extracted from the primary gas flow through at least one opening such as slots configured to permit the solid particles that have been forced outwardly toward the cylindrical cyclone body 62 to exit therefrom by the centripetal force of the cyclone 51. In the primary separator stage A, the removed particles fall into a primary or first stage solids chamber 68A between the primary stage first tube sheet 56a and a primary stage second tube sheet 74a. The first tube sheet 56a and the second tube sheet 74a limit communication between the primary stage solids chamber 68A and the rest of the MSS vessel 50. The primary stage second tube sheet 74a is preferably shaped as a funnel or inverted cone to guide the solids into a primary solids exit tube 76a through which the solids and a minor amount of underflow gas exit the primary stage solids chamber 68A. In an embodiment, the primary solids exit tube 76a extends from the MSS vessel 50 through an outlet 84a defined by a nozzle 83a. In another embodiment, the primary solids exit tube takes an angular bend such as 90° and extends through the cylindrical side portion 86a of the MSS vessel 50. A small amount of underflow gas stream is removed through the primary solids exit tube 76a as well. The relative elevation of the tube sheets 56a and 74a may be reversed, as long as they are opposed to each other to provide a first pair of opposed tube sheets 56a and 74a, respectively.

Purified gas, from which the solids have been removed by the primary separator stage A, flows vertically downward through the cylindrical cyclone body 62, passes through an inlet 70 preferably at the top of the clean gas outlet tube 72. The purified gas is then discharged via the clean gas outlet tube 72 through or below the second or lower tube sheet 74a into a second gas inlet chamber 57b. An outlet 75 of the outlet tube 72 is preferably at the lower end thereof and is secured to the lower tube sheet 74a preferably by a welded plate bushing. The lower tube sheet 74a defines a preferably upper boundary to the second gas inlet chamber 57b and prevents communication between the second gas inlet chamber 57b and to the primary stage solids chamber 68A. Primary stage purified gas may be selectively exited through a first stage gas outlet 80a from the MSS vessel 50. In an embodiment, the gas outlet 80a is positioned below the lower tube sheet 74a through a gas outlet nozzle 81a which extends from the vertical wall of the MSS vessel 50.

Based upon a setting on a valve regulating flow through the outlet 80a, some or all of the gas in the second gas inlet chamber 57b flows preferably downwardly to the secondary separator stage B for even further purification.

The secondary separator stage B includes a first or upper tube sheet 56b that retains the first or top ends 58 of the respective cyclones 51. In an embodiment, the upper tube sheet 56b extends the entire cross-section of the MSS vessel 50 in a manner that separates the interior to define the lower or second gas inlet chamber 57b so as to limit communication from the second gas inlet chamber 57b and to remainder of the MSS vessel 50 except through the cyclones 51. In particular, each of the cyclones 51 has a cyclone inlet 60 that is open to the second gas inlet chamber 57b. The first tube sheet 56b may include a cover 59b for an optional manway in order to provide access through the first tube sheet 56b.

The secondary separator stage B also includes a second or lower tube sheet 74b and is equipped with a plurality of cyclones 51. Solid particles are extracted from the secondary gas flow, and the removed particles fall into a secondary stage solids chamber 68b between the secondary stage upper tube sheet 56b and the lower tube sheet 74b. The upper tube sheet 56b and the lower tube sheet 74b limit communication between the secondary stage solids chamber 68b and the rest of the MSS vessel 50. The secondary stage lower tube sheet 74b is preferably shaped as a funnel or inverted cone to guide the solids into a second exit tube 76b through which the solids and a minor amount of underflow gas exit the secondary stage solids chamber 68b. In an embodiment, the solids exit tube 76b extends from the MSS vessel 50 through an outlet 84b defined by a nozzle 83b. Preferably, the exit tube 76b extends through the bottom portion 86b of the MSS vessel 50. A small amount of underflow gas stream is discharged through the second exit tube 76b as well. The relative elevation of the tube sheets 56b and 74b may be reversed, as long as they are opposed to each other to provide a first pair of opposed tube sheets 56b and 74b, respectively.

Purified gas, from which the solids have been removed at the secondary separator stage B, flows preferably vertically and preferably downwardly through the cylindrical cyclone body 62, passes through the inlet 70 of the clean gas outlet tube 72. The purified gas is then discharged via the clean gas outlet tube 72 below or through the lower tube sheet 74b into an outlet or lower gas chamber 78. The lower tube sheet 74b of the secondary separator stage B defines a preferably upper boundary to the lower gas chamber 78 and prevents communication between the lower gas chamber 78 and to the secondary stage solids chamber 68b. Secondary stage purified gas may exit through a clean gas outlet 80b from the MSS vessel 50 preferably through the bottom portion 86b of the MSS vessel. The gas outlet 80b is positioned below the secondary stage lower tube sheet 74*b* through a gas outlet nozzle 81*b* which extends from the wall of the MSS vessel 50. More than one gas outlet may be utilized. A trash screen or grating (not shown) may be installed in the clean gas outlet 80*a* or 80*b* to block passage of spalling refractories.

The MSS vessel 50 thus adds at least one stage of separation within a single vessel, as compared to a conventional single-stage TSS. The additional stage in the MSS vessel 50 has been projected to reduce the emission level to below 0.6 lb particulate/1000 lb coke even when the inlet flow contains an unusually high particulate loading of 475 mg/Nm$^3$, a significant improvement over the separation performance of a conventional single-stage TSS. The velocities in each of the multiple stages A and B can be designed to operate at different velocities to minimize attrition while optimizing particle capture. Furthermore, the multiple internal stages A and B may have individual underflow streams, each preferably with individual underflow barrier filters which provide double protection against high catalyst carryover rates from the FCC regenerator especially in the event of an upset FCC operation condition. Such separate underflow systems also advantageously provide the ability to troubleshoot and evaluate the performance of each stage individually. Additionally, the volumetric flow rate of the under flow streams exiting the MSS vessel 50 through outlets 84*a* and 84*b* may be adjusted independently to improve performance. The relative positioning of tube sheets 56*a*, 74*a*, 56*b*, 74*b* and primary and secondary cyclone stages A and B, although shown from top down, may be changed wholly or in part without departing from the scope of the invention. It is also contemplated that more than two cyclone stage may be utilized in the MSS vessel 50.

EXAMPLE

The projected performance of the MSS in an FCC application has been compared to the performance of a TSS. With a conventional single-stage TSS, wherein the inlet flow into the TSS was 68 lbs/hr of particulate, the single stage separator yielded a purified gas with an emission of 0.78 lb/1000 lbs coke. Certain applications may require guaranteed emissions of less than 0.80 lb/1000 lbs coke, in which case such a single-stage separator would not provide a desired design margin of performance. We projected, based on data from operating units, that if all of the purified gas from a conventional TSS with a single stage at a loading of 14 lbs/hr of particulate were introduced to a second stage as would occur in an MSS vessel of the present invention, it would yield an overall emission of 0.54 lb/1000 lbs coke, a significant improvement in particulate removal and well within a design margin to satisfy, for example, a guaranteed emission of less than 0.80 lb/1000 lb coke. This projected 30% improvement in purity of the clean gas exiting the secondary separator stage clean gas outlet nozzle 81*b* over the purity of purified gas leaving the conventional primary separator stage of a TSS was completely unexpected.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A vessel for separating particulate solids from a contaminated gas stream, the vessel comprising:

a wall defining a generally cylindrical interior, the wall including a vessel inlet through which a particle-contaminated gas stream enters the interior and a vessel outlet;

a primary cyclone stage in fluid communication with the vessel inlet comprising:

a primary first tube sheet and a primary second tube sheet, each of the first and second tube sheets extending across the interior;

a primary plurality of separation cyclones, each of the cyclones having a substantially vertical cyclone body having a first end fixed with respect to the first tube sheet and a second end, the top end defining a cyclone inlet for receiving the particle-contaminated gas stream, the cyclone operable to induce centripetal acceleration of the particle-contaminated gas stream and to discharge particulates between the respective first tube sheet and second tube sheet, and a first gas outlet extending through the second tube sheet for discharging a first purified gas stream through the second tube sheet; and a secondary cyclone stage in fluid communication with the first gas outlet and spaced apart from the primary cyclone stage, said secondary cyclone stage comprising:

a secondary first tube sheet and a secondary second tube sheet, each of the secondary first and second tube sheets extending across the interior;

a secondary plurality of separation cyclones, each of the cyclones having a substantially vertical cyclone body having a first end fixed with respect to the secondary first tube sheet and a second end, the first end defining a cyclone inlet for receiving the first purified gas stream, the cyclone operable to induce centripetal acceleration of the particle-contaminated first purified gas stream and to discharge particulates between the respective first tube sheet and second tube sheet, and a second gas outlet extending through the second tube sheet for discharging a second purified gas stream through the second lower tube sheet.

2. The vessel of claim 1, wherein said second gas outlet comprises a gas outlet tube with an end of said gas outlet tube extending through and being secured to the respective second tube sheet.

3. The vessel of claim 2, wherein the cyclone body further includes at least one discharge opening for discharging particulates from between a respective pair of first and second tube sheets.

4. The vessel of claim 3, wherein the discharge opening permits a small amount of underflow to exit with the discharged particulates.

5. The vessel of claim 2, wherein said gas outlet tube is slidably positioned with respect to said cyclone body.

6. The vessel of claim 1 wherein the inlet is in communication with a catalyst regeneration vessel.

7. The vessel of claim 1 wherein said primary cyclone stage is above said secondary cyclone stage and said first tube sheet is above said second tube sheet in said primary and secondary cyclone stages.

8. A system comprising:

a catalyst regeneration vessel including at least one cyclone to remove at least some solid particles from a contaminated gas stream;

a separator vessel for further removing particulate solids from the contaminated gas stream, the vessel comprising:

a wall defining a generally cylindrical interior, the wall including a vessel inlet through which a particle-contaminated gas stream enters the interior and a vessel outlet;

a primary cyclone stage in fluid communication with the vessel inlet comprising:

a primary upper tube sheet and a primary lower tube sheet, each of the primary upper and lower tube sheets extending across the interior;

a primary plurality of separation cyclones, each of the cyclones having a substantially vertical cyclone body having a top end fixed with respect to the primary upper tube sheet and a bottom end, the top end defining a cyclone inlet for receiving the particle-contaminated gas stream, the cyclone operable to induce centripetal acceleration of the particle-contaminated gas stream and to discharge particulates between the respective primary upper tube sheet and primary lower tube sheet, and a primary gas outlet extending through the primary lower tube sheet for discharging a first purified gas stream below the primary lower tube sheet; and a secondary cyclone stage in fluid communication with the primary gas outlet and spaced apart from the primary cyclone stage, said secondary cyclone stage comprising:

a secondary upper tube sheet and a secondary lower tube sheet, each of the secondary upper and lower tube sheets extending across the interior;

a secondary plurality of separation cyclones, each of the cyclones having a substantially vertical cyclone body having a top end fixed with respect to the secondary upper tube sheet and a bottom end, the top end defining a cyclone inlet for receiving the first purified gas stream, the cyclone operable to induce centripetal acceleration of the particle-contaminated first purified gas stream and to discharge particulates between the respective secondary upper tube sheet and secondary lower tube sheet, and a secondary gas outlet extending through the secondary lower tube sheet for discharging a second purified gas stream through the secondary lower tube.

9. The system of claim 8, wherein said second gas outlet comprises a gas outlet tube with an end of said gas outlet tube extending through and being secured to the respective second tube sheet.

10. The system of claim 9, wherein the cyclone body further includes at least one discharge opening for discharging particulates from between the respective upper and lower tube sheets.

11. The system of claim 10, wherein the discharge opening permits a small underflow gas stream to exit the vessel with the discharged particulates.

12. The system of claim 9, wherein said gas outlet tube is slidably positioned with respect to said cyclone body.

13. The system of claim 8 wherein the primary and secondary cyclone stages are positioned in series vertically below the inlet and vertically spaced from each other.

14. A process for separating particulate solids from a contaminated gas stream, the process comprising the steps of:

delivering said contaminated gas stream through an inlet pipe to a separator vessel having a wall that defines an interior;

providing a primary separator stage comprising a primary first tube sheet and a primary second tube sheet, each of the first tube sheet and the second tube sheet extending across the interior, a primary plurality of separation cyclones, each of the cyclones having a substantially vertical cyclone body having a first end fixed with respect to the first tube sheet and a second end, the first end defining a cyclone inlet for receiving the particle-contaminated gas stream, the cyclone operable to induce centripetal acceleration of the particle-contaminated gas stream and to discharge particulates between the first tube sheet and the second tube sheet, and a first gas outlet extending through the second tube sheet for discharging a first purified gas stream through the second tube sheet;

providing a secondary separator stage comprising a secondary first tube sheet and a secondary second tube sheet, each of the first tube sheet and the second tube sheet extending across the interior, a secondary plurality of separation cyclones, each of the cyclones having a substantially vertical cyclone body having a first end fixed with respect to the first tube sheet and a second end, the first end defining a cyclone inlet for receiving the particle-contaminated gas stream, the cyclone operable to induce centripetal acceleration of the first purified gas stream and to discharge particulates between the first tube sheet and the second tube sheet, and a second gas outlet extending through the secondary second tube sheet for discharging a second purified gas stream through the second tube sheet;

passing the contaminated gas stream through the primary stage, separating an amount of particulate solids from the contaminated gas stream and dispensing the solids between the respective primary first and second tube sheets of the primary stage; and passing at least a portion of a first purified gas stream from the primary stage through the secondary stage, separating a further amount of particulate solids from the first purified gas stream and dispensing the solids between the respective secondary first and second tube sheets of the secondary stage.

15. The process of claim 14, further comprising the step of delivering particulate solids captured between the first and second tube sheets of the primary stage from the vessel through a first exit tube.

16. The process of claim 15, further comprising removing a small underflow gas stream through the first exit tube.

17. The process of claim 16, further comprising the step of delivering particulate solids captured between the secondary first and second tube sheets of the secondary stage from the vessel through a second exit tube.

18. The process of claim 17, further comprising removing a small underflow gas stream through the second exit tube.

19. The process of claim 16 further comprising removing a portion of the first purified gas stream from the vessel and passing another portion of the first purified gas stream to the secondary stage.

20. The process of claim 14 wherein said first purified gas passes downwardly from the primary cyclone stage to said secondary cyclone stage and said first tube sheet is above said second tube sheet in said primary and secondary cyclone stages.

21. The process of claim 18 wherein the volumetric flow rate of the small underflow gas stream through the first exit tube and the volumetric flow rate of the small underflow gas stream through the second exit tube are different.

* * * * *